United States Patent

[11] 3,628,181

[72] Inventor Arthur Maitland
 St. Andrews, Fife, Scotland
[21] Appl. No. 887,492
[22] Filed Dec. 23, 1969
[45] Patented Dec. 14, 1971
[73] Assignee National Research Development Corporation
 London, England
[32] Priority Jan. 1, 1969
[33] Great Britain
[31] 151/69

[54] GAS DISCHARGE LASERS
 11 Claims, 7 Drawing Figs.
[52] U.S. Cl. .................................................... 331/94.5
[51] Int. Cl. ..................................................... H01s 3/09
[50] Field of Search .......................................... 331/94.5;
 313/189, 217, 231

[56] References Cited
UNITED STATES PATENTS
3,458,830 7/1969 Geller et al. .................. 331/94.5
3,516,012 6/1970 Huchitol ....................... 331/94.5

Primary Examiner—William L. Sikes
Attorney—Cushman, Darby and Cushman

ABSTRACT: Laser apparatus comprises means for producing a laser discharge in a laser active gas, and reflecting means arranged to generate laser action in the gas pumped by the said discharge, the cathode of the said discharge being constituted in operation by a plasma jet. The plasma jet cathode may be provided by producing a subsidiary discharge, and effecting a flow of the laser active gas from the region of the subsidiary discharge towards the region of the laser discharge to form the said plasma jet.

Patented Dec. 14, 1971  3,628,181

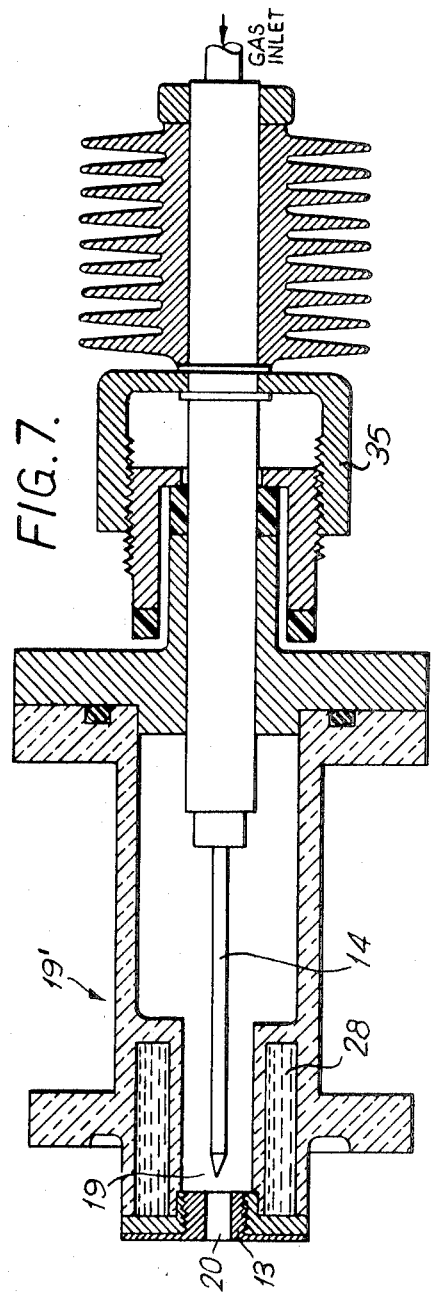

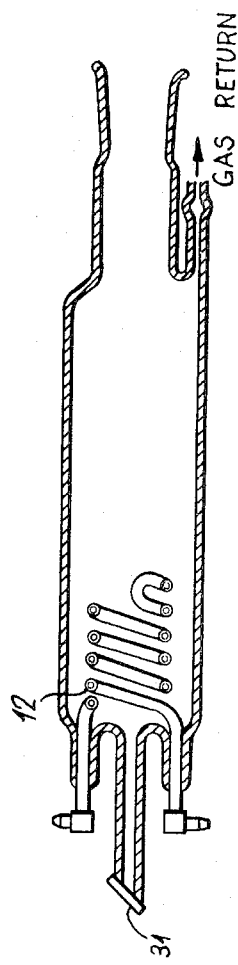
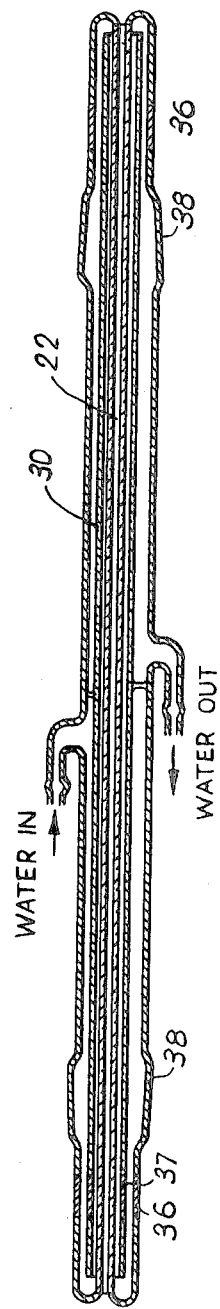

GAS DISCHARGE LASERS

The present invention relates to gas discharge lasers.

A conventional gas discharge laser in which the discharge is produced between electrodes inserted into the system, uses a cold cathode, or a hot, thermionically emitting, cathode as the primary source of electrons. In both cases the cathode does not create any excited atoms independent of the discharge between the electrodes and, in this aspect, the cathode is passive with respect to the discharge. Also, no attempt is made to control the cathode environment.

According to the present invention there is provided laser apparatus comprising means for producing a laser discharge in a laser active gas, and reflecting means arranged to generate laser action in the gas pumped by the said discharge, the cathode of the said laser discharge being constituted in operation by a plasma jet.

The apparatus may include means for producing a subsidiary discharge, and means for effecting a flow of the laser active gas from the region of the subsidiary discharge towards the region of the laser discharge to form the said plasma jet.

There may be provided apparatus in which the means for producing the subsidiary discharge includes a subsidiary anode and a subsidiary cathode, and the means for producing the laser discharge includes a laser anode spaced from the subsidiary anode and positioned on the side of the subsidiary anode remote from the subsidiary cathode. The laser discharge may be maintained between the electrodes connected in one of two arrangements; in the first arrangement, the electrode supporting the plasma jet cathode of the laser discharge is the anode of the subsidiary discharge, and in the second said arrangement the electrode supporting the plasma jet cathode of the laser discharge is the cathode of the subsidiary discharge.

The apparatus may include a laser discharge tube in which the laser discharge takes place, and a subsidiary discharge chamber in which the subsidiary discharge takes place, the tube and the chamber being in communication with each other, the subsidiary anode being positioned between the tube and the chamber and having an aperture to allow gas to pass to generate a plasma jet in the laser discharge tube, the means for effecting the flow of gas including an inlet port in the discharge chamber an an outlet port in the discharge tube.

The plasma jet may be used to introduce electrons and excited ionic and neutral species into the laser discharge from the cathode regime, to control the temperatures of the electrons and the various species in the cathode region, and to control the pressure of the cathode regime.

The usual thermionic cathodes suffer from the serious disadvantages of being easily contaminated and damaged by arc spots which readily form under certain conditions. The cathodes are expensive and usually require the services of a skilled glass blower for replacement. The state of the art of argon lasers is such that gas cleanup is a problem with DC devices, necessitating vacuum and gas handling equipment in which there is the possibility that the cathode may be contaminated and damaged. In embodiments of the present invention utilizing a plasma jet cathode these disadvantages can be reduced or eliminated and the cathode can be made to be very robust in operation. The plasma jet is particularly useful as a cathode when large discharge currents of about 30 amperes up to several hundred amperes or above are to be maintained.

Embodiments of the invention will now be described, by way of example, with reference to the accompanying drawings, in which:

FIG. 5 shows the construction of a laser tube of laser apparatus embodying the invention;

FIG. 6 shows the construction of the laser anode of laser apparatus embodying the invention; and FIG. 7 is a cross section through a plasma jet assembly of apparatus embodying the invention.

Figure 1:
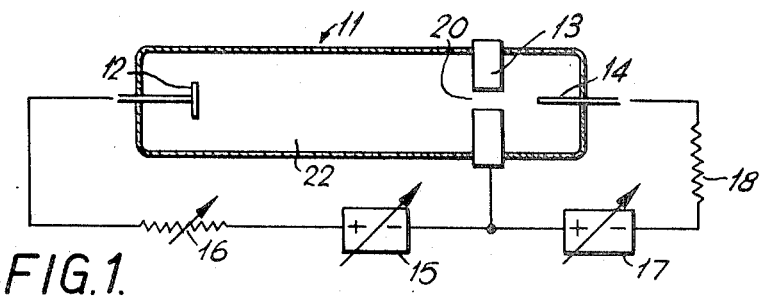
FIG. 1 is a schematic drawing of one configuration of a discharge circuit of apparatus embodying the invention.
Figure 2:
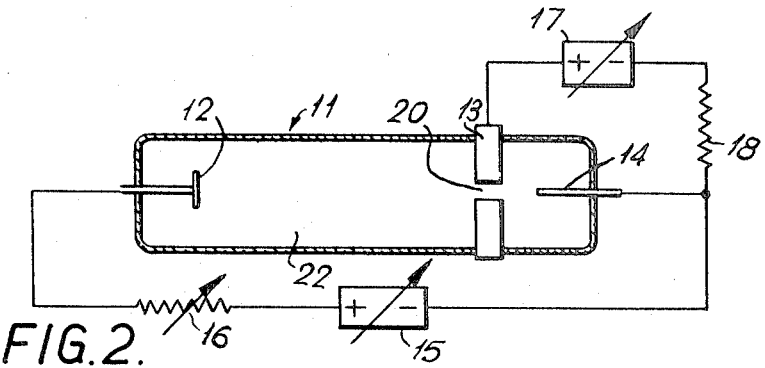
FIG. 2 is a schematic drawing of another configuration of a discharge circuit.

In FIGS. 1 and 2 there are shown two configurations of electrode connections for gas discharge apparatus 11 embodying the invention. In each FIG., the apparatus 11 has a laser discharge anode 12, a subsidiary anode 13 and a subsidiary cathode 14. Two discharges occur, of which the discharge in the region between the laser anode 12 and the subsidiary anode 13 (in which population inversions are sought) is the laser discharge. The discharge between the electrodes 13 and 14 will be referred to as the subsidiary or jet discharge. In FIG. 1, the subsidiary anode 13 of the jet discharge is connected to support the plasma jet cathode of the laser discharge. In FIG. 2, the cathode 14 of the jet also supports the plasma jet cathode of the laser discharge.

In FIG. 1 the laser discharge is energized by a unidirectional voltage source 15 in series with a variable resistor 16, and the jet discharge is powered by a second voltage source 17 in series with a resistor 18.

In FIG. 2 the first voltage source 15 is connected across the electrodes 12 and 14 and the second voltage source 17 is connected as in FIG. 1.

The overall operation of the apparatus is that a subsidiary discharge is struck between the electrodes 13 and 14 and is forced by gas flowing through the apparatus to extend through an aperture 20 in the anode 13 into a laser discharge tube 22 of the apparatus. The jet discharge then forms a plume extending from the region of the anode 13 and provides a plasma jet cathode for the laser discharge.

Figure 3:
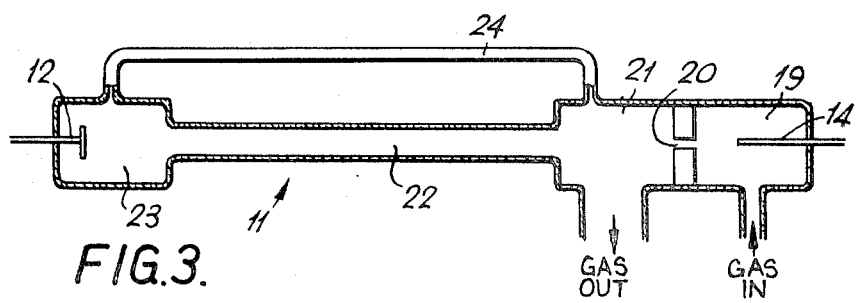
FIG. 3 illustrates schematically a gas system of apparatus embodying the invention.

A gas flow system for the laser apparatus 11 is shown schematically in FIG. 3. Gas enters a subsidiary discharge chamber 19 from which it leaves through the orifice 20 in the anode 13 into a region 21 from which it is pumped. The pressure difference between the regions 19 and 21 may be a factor of between 100 and 1,000 to 1 and the two are largely independent. When the laser discharge is running, electrophoresis effects of the discharge introduce a pumping action which drives gas along the laser tube 22 into an anode region 23. To minimize the pressure gradient between the regions 21 and 23 along the tube 22, a tube 24 is connected between the regions 21 and 23 to provide a return path for the gas. A control of the pressure in the region 23 which is largely independent of the pressure in the region 21 and the electrophoresis effects, may be given by anode pumping in which a separate rotary pump, in addition to tube 24, or instead of tube 24, is used to evacuate the anode region 23. Anode pumping is not essential for the effective operation of the laser, but does considerably increase the range of conditions under which the system operates as a laser.

With the circuit of FIG. 1, the jet can produce excited species and the cathode region of the main discharge can be controlled by the discharge characteristics of the jet. As will be explained hereinafter, the discharge conditions in the cathode region of FIG. 2 are quite different from those of FIG. 1.

Figure 4:
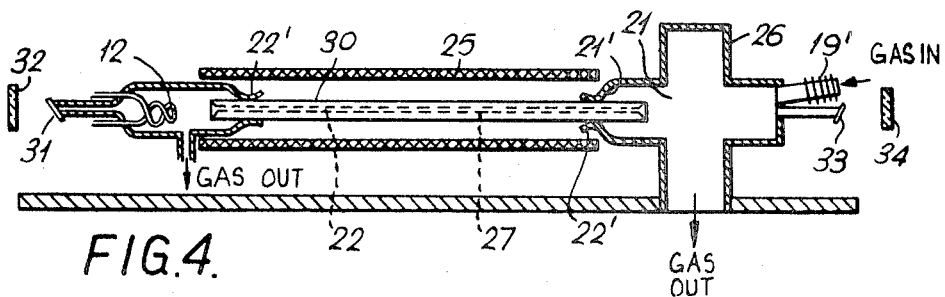
FIG. 4 illustrates schematically part of a gas laser apparatus embodying the invention.

Part of the assembled gas laser equipment is shown schematically in FIG. 4. The laser discharge tube 22 of quartz is supported by cone socket joints 22' and is surrounded by a cooling water jacket 30 (shown in FIG. 5). The laser discharge tube is located with its longitudinal axis coincident with the longitudinal axis of a solenoid 25. The solenoid 25 is used to increase the power of the laser radiation generated. At one end a Brewster window 31 seals the laser tube 22 and allows radiation from the laser discharge to pass to a mirror 32. The anode 12 is in the form of a double coil, allowing the laser discharge radiation to pass along the axis of the coil. At the other end of the main discharge tube 22 a nonmagnetic stainless-steel cylindrical cross 26 forms the chamber 21 and provides a mounting for a second Brewster window 33 leading to a mirror 34. The subsidiary chamber 19 is formed in a jet assembly 19' which is mounted on the same arm of the cross 26 as the window 33, but is inclined at an angle to the optical axis so that the plasma jet is directed towards the end of the laser discharge tube.

When the power supply is switched on, a switching transient may be arranged to charge a condenser to give about 1,000 volts across the laser tube to initiate the discharge when the gas is excited by a Tesla coil. It is necessary to have sufficient follow current to bring the discharge volt-ampere characteristic to within the compass of the power unit driving the laser discharge. Alternatively, the laser discharge may be initiated by discharging a condenser between a third electrode located near the laser discharge anode and the laser discharge cathode.

The anode and cathode of the laser discharge power supply are preferably both isolated from ground so that the whole vacuum envelope is also electrically isolated. This system is adopted to avoid difficulties with linking the laser discharge with the jet discharge. Alternatively, if the laser discharge power supply and the plasma jet power supply are both supplied through transformers which electrically isolate them from the mains supply, the jet anode can be grounded.

The plasma jet power unit is also quite conventional and in one example the unit may give 128 volts and 45 a. with 1 percent ripple. The voltage is controlled between 0–128 volts by a variac, and the current is limited by a resistor.

To trigger the laser discharge, a Tesla coil is used and is connected to a piece of wire wrapped around the center of the laser tube or inserted into the water jacket of the laser discharge tube, the conditions under which the discharge may be triggered vary considerably, but it is generally necessary to have a clean vacuum system and a well established plasma jet with the plume of the jet extending well into the center region of the stainless-steel cross 26 which in practice houses the region 21 of FIG. 3.

To facilitate change of laser tube (for example having different tube diameters and hence different current densities) the laser tube is fitted to the vacuum envelope by a conventional cone and socket joint 22'. An example of a novel design which may be used is shown in FIGS. 5 and 6. In FIG. 4, one end of the tube 22 is attached to the envelope of anode 12 by means of a cone-socket joint 22' sealed with "black wax" (Apiezon W) or vacuum grease, and the other end by a similar joint 22' to a flange 21' bolted to the stainless-steel cross 26 of FIG. 4. The capillary tube 22 constraining the discharge is quartz and the water jacket 30 may be Pyrex (Registered Trademark). In FIG. 5, graded seals 36, and wax joints 38 are water cooled. The graded seal 37 shown at the end of the internal sleeve of the water jacket is necessary because of the high temperature at which quartz works as compared with Pyrex and the fact that the sleeve must be placed near the end of the quartz tube to ensure efficient cooling throughout the length of the constricted discharge. Alternatively, a tube of the same geometry may be fabricated entirely in quartz.

Referring to FIG. 6, the anode 12 is a helix of copper tube which is water cooled and is located with the tip of the helix at a minimum distance of about 6 inches from the tip of the laser discharge tube. At shorter distances, the discharge at high current may reach the anode glass-metal seals. Tubes of any uniform bore from nominal 2 mm. to 2 cm. may be used depending on the laser discharge current to be used. The 2 cm. bore tube may be used with currents of about 500 a. and it is then not necessary to use the solenoid 25 to produce a magnetic field.

The system may be evacuated by one or two rotary pumps according to the pumping capacity. In one system, two pumps are used, each of which has a speed of about 4 liters/second at a pump inlet pressure of about 200 m torr (the pressure at which the system operates as a laser in argon). The quoted displacement of the pump is 5.9 liters/second and its ultimate pressure is 10 m torr. Alternatively, a single-stage rotary pump backing a vapor booster pump of conventional design may be used.

The gas flow is monitored by a gas flowmeter and regulated by a leak valve. The range of flow rates used with argon (NTP) is about 50–1,000 ml. (NTP)/min.

Laser action may be obtained with industrial grade argon or alternatively 99.995 percent pure argon. The plasma jet cathode is also suitable for maintaining the discharges in other gases including neon and nitrogen.

FIG. 4 shows the stainless-steel chamber or cross 26 into which the plasma jet expands. As the current of the main discharge is increased, the volume of the discharge in region 21 (FIG. 3) between the end of the capillary 27 and the jet orifice 20 in the electrode 13 increases. At higher currents, the discharge fills the volume of the horizontal cylinder of the cross 21 and thus water cooling of the cross is necessary.

On one system, water from a 70 p.s.i. supply cools the main discharge tube 22, the anode 12, the solenoid 25 producing the magnetic field, the anode and body of the plasma jet, and the flange into which the plasma jet unit is inserted. The cathode of the plasma jet is air-cooled (natural convection) for jet currents up to 60 a. and is water-cooled for larger currents.

Many plasma jet designs may be operated successfully as cathodes for maintaining the main discharge and may include air-cooled and water-cooled arrangements. A plasma jet assembly for jet currents up to 60 a., is shown in FIG. 7. The copper anode 13 lies within the brass cylinder of a water jacket 28. The voltage across the jet in argon varies between about 8 and 20 volts according to conditions and the type of jet design used and typically may be about 10 volts at about 30 a.

The principal consideration in the design and operation of the plasma jet unit 19' are as follows. Referring to FIG. 7, the thoriated tungsten cathode 14 must be of a thermal capacity such that the tip can reach a temperature sufficient to maintain thermionic emission and thus provide a stable discharge. The anode 13 is water-cooled copper to reduce contamination of the jet by anode material. The gas mass flow rate must be sufficiently low in relation to the arc current to enable the gas to be heated by the arc to the temperature necessary to maintain the arc. At large flow rates, the gas cools the arc and extinguishes it.

Several sizes and shapes of jet orifice may be used with various diameter to length ratios. By way of example the orifice may be of diameter 0.1 inch and length 0.45 inch.

The plasma jet may be started by "touch" or "trigger." To start the jet by touch, the gas flow is set to about 400 cc./min. and the potential between the electrodes is set at about 100 volts. The cathode 14 is moved by a sliding arrangement 35 to touch the anode and an arc is drawn. With fresh electrodes, it is often necessary to repeat this operation a dozen or so times before an arc is drawn; with electrodes which have operated for many minutes one touch is successful.

In trigger starting, any of the conventional methods of starting the jet discharge may be used. For example, at suitable pressures and spacing between the anode and cathode of the plasma jet, the jet discharge may be started by the Tesla coil connected to the piece of wire wrapped around the center of the laser discharge tube and referred to above.

The flow rate, jet current, and the laser discharge current are found to affect the pressure in the various parts of the system. The main discharge current is itself affected by the pressure and the jet current. The performance varies according to whether circuit of FIG. 1 or 2 is used, and so on. These complex interrelationships soon become evident and vary in detail with jet orifice design and jet electrode spacing.

A condition may arise in which the cathode region of the main discharge breaks up into cathode spots which run over the plasma jet flange. This breakup may be due to the current density at the orifice exceeding a critical value. This breakup also may limit the current at which the main discharge may be run with circuit 1. With a wide orifice (0.1 inch), this breakup may be reduced.

With the circuit of FIG. 2, in which the cathode of the main discharge is common with the plasma jet cathode, it is possible to reduce the current in the jet circuit to zero without breakup. In this case, the system operates as a low-pressure laser discharge with a high-pressure cathode region which drives the ionized gas of the discharge through the orifice 20 in the subsidiary jet-anode into the low-pressure region 21 to form a plasma jet. With the circuit of FIG. 1, the current which may be established in the main discharge depends upon the current in the jet.

I claim:

1. In laser apparatus having means for producing a laser discharge in a laser active gas including a cathode and anode, a laser discharge tube, and reflecting means arranged to generate laser action in the gas in said tube pumped by the said discharge, the improvement comprising means for producing in said tube a plasma jet which constitutes the cathode.

2. In apparatus according to claim 1 wherein said producing means includes means for producing a subsidiary discharge, and means for effecting a flow of the laser active gas from the region of the subsidiary discharge towards the region of the laser discharge to form said plasma jet.

3. In apparatus according to claim 2 wherein the means for producing the subsidiary discharge includes a subsidiary anode and a subsidiary cathode, and the means for producing the laser discharge includes a laser anode spaced from the subsidiary anode and positioned on the side of the subsidiary anode remote from the subsidiary cathode.

4. In apparatus according to claim 3, wherein the subsidiary anode is composed of copper and the subsidiary cathode is composed of tungsten, the apparatus being adapted to operate with argon as the laser active gas.

5. In apparatus according to claim 3 including a laser discharge tube in which the first discharge takes place, and a subsidiary discharge chamber in which the subsidiary discharge takes place, the tube and the chamber being in communication with each other, the subsidiary anode being positioned between the tube and the chamber and having an aperture to allow gas to pass to generate a plasma jet in the discharge tube, the means for effecting the flow of gas including an inlet port in the discharge chamber and an outlet port in the discharge tube.

6. In apparatus according to claim 5 wherein the laser discharge tube defines two gas outlet ports positioned to allow removal of gas from the region of the laser anode and from the region of the plasma jet.

7. In apparatus according to claim 3 including means for applying between the subsidiary cathode and the subsidiary anode a first unidirectional voltage, and between the subsidiary anode and the laser anode a second unidirectional voltage.

8. In apparatus according to claim 3 including means for applying between the subsidiary cathode and the subsidiary anode a first unidirectional voltage, and between the subsidiary cathode and the laser anode a second unidirectional voltage.

9. A method of generating a laser output from laser apparatus including a laser discharge tube, a subsidiary cathode, a subsidiary anode and a laser anode spaced from the subsidiary anode including the steps of:

effecting a flow of laser active gas from the subsidiary cathode and subsidiary anode to the laser anode, applying a first unidirectional voltage between the subsidiary cathode and the subsidiary anode to strike the subsidiary discharge and produce a plasma jet in the laser discharge tube, and applying a second unidirectional voltage between the subsidiary anode and the laser anode to generate a laser discharge in said discharge tube between the laser anode and the plasma jet cathode.

10. A method of generating a laser output from laser apparatus including a laser discharge tube, a subsidiary cathode, a subsidiary anode and a laser anode spaced from the subsidiary anode including the steps of:

effecting a flow of laser active gas from the subsidiary cathode and subsidiary anode to the laser anode, applying a first unidirectional voltage between the subsidiary cathode and the subsidiary anode to strike the subsidiary discharge and produce a plasma jet in the laser discharge tube which forms a plasma jet cathode, applying a second unidirectional voltage between the laser anode and the subsidiary cathode to generate a laser discharge between the laser anode and the plasma jet cathode.

11. A method according to claim 10 including the step of reducing the first unidirectional voltage to zero after laser action has commenced.

* * * * *